(12) United States Patent
Roberge et al.

(10) Patent No.: US 10,383,192 B2
(45) Date of Patent: Aug. 13, 2019

(54) CONTACTLESS LED LIGHTING FIXTURE AND LED LIGHTING NETWORK INCLUDING CONTACTLESS LED LIGHTING FIXTURE

(71) Applicant: SIGNIFY HOLDING B.V., Eindhoven (NL)

(72) Inventors: Brian Roberge, Franklin, MA (US); Dirk Fieberg, Groton, MA (US); Jonathan Stuart Levy, Somerville, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 151 days.

(21) Appl. No.: 15/129,127

(22) PCT Filed: Mar. 11, 2015

(86) PCT No.: PCT/IB2015/051755
§ 371 (c)(1),
(2) Date: Sep. 26, 2016

(87) PCT Pub. No.: WO2015/145284
PCT Pub. Date: Oct. 1, 2015

(65) Prior Publication Data
US 2018/0177021 A1 Jun. 21, 2018

Related U.S. Application Data

(60) Provisional application No. 61/969,495, filed on Mar. 24, 2014.

(51) Int. Cl.
*H05B 37/02* (2006.01)
*H02J 50/60* (2016.01)
(Continued)

(52) U.S. Cl.
CPC ............ *H05B 37/02* (2013.01); *H02J 3/34* (2013.01); *H02J 7/025* (2013.01); *H02J 13/002* (2013.01);
(Continued)

(58) Field of Classification Search
CPC ............ H05B 33/0815; H05B 37/0272; H05B 33/0803; H05B 33/0845; H05B 33/0857;
(Continued)

(56) References Cited

U.S. PATENT DOCUMENTS 6,016,038 A   1/2000   Mueller et al.
6,211,626 B1  4/2001   Lys et al.
(Continued)

FOREIGN PATENT DOCUMENTS

JP   2003077688 A1   7/2005
JP   2007067764 A2   3/2007
(Continued)

OTHER PUBLICATIONS

Mesa Systems Co., "Inductive Power Transfer and Data Coupling Devices (IPT+DC)," Sep. 2013 (10 pages).

*Primary Examiner* — Tung X Le
*Assistant Examiner* — Borna Alaeddini
(74) *Attorney, Agent, or Firm* — Meenakshy Chakravorty (57) ABSTRACT

A lighting network includes a lighting network base station and one or more contactless lighting network components. The lighting network base station includes: a radio frequency (RF) amplifier which supplies an RF power signal to a lighting network line pair; and a first power line communication coupler which couples the lighting network line pair to a first power line communication device. The contactless lighting network component extracts electrical power from the RF power signal on the lighting network line pair, and couples the lighting network line pair to a second power line (Continued)

communication device. The first and second power line communication devices communicate network data via the lighting network line pair. The contactless lighting network component may include a lighting fixture (e.g., including one or more LED light sources), a sensor, and/or a lighting network interface adaptor.

13 Claims, 4 Drawing Sheets

(51) Int. Cl.
*H02J 7/02* (2016.01)
*H02J 50/10* (2016.01)
*H04B 3/54* (2006.01)
*H02J 13/00* (2006.01)
*H02J 50/05* (2016.01)
*H02J 50/80* (2016.01)
*H02J 3/34* (2006.01)
*H05B 33/08* (2006.01)

(52) U.S. Cl.
CPC ............ *H02J 50/05* (2016.02); *H02J 50/10* (2016.02); *H02J 50/60* (2016.02); *H02J 50/80* (2016.02); *H04B 3/54* (2013.01); *H04B 3/542* (2013.01); *H05B 33/0842* (2013.01); *H05B 37/0263* (2013.01); *H04B 2203/5454* (2013.01); *H04B 2203/5458* (2013.01); *H04B 2203/5483* (2013.01); *Y02B 90/2615* (2013.01); *Y02B 90/2692* (2013.01); *Y04S 40/121* (2013.01); *Y04S 40/146* (2013.01)

(58) Field of Classification Search
CPC ............ H05B 37/02; H05B 37/0263; H05B 33/0809; H05B 33/0812; H05B 33/04; H05B 33/08; H05B 33/0806; H05B 33/0842; H05B 33/0851; H05B 33/0863; H05B 33/0896; H05B 37/0209; H05B 37/0254; H05B 39/00; H05B 39/04; H05B 39/044
See application file for complete search history.

(56) References Cited

U.S. PATENT DOCUMENTS

| | | |
|---|---|---|
| 2002/0008973 A1 | 1/2002 | Boys et al. |
| 2006/0252370 A1 | 11/2006 | Goossens et al. |
| 2008/0185918 A1 | 8/2008 | Metz et al. |
| 2011/0074382 A1* | 3/2011 | Patel ................. G01R 15/207 324/76.11 |
| 2012/0326526 A1 | 12/2012 | Rhodes et al. |
| 2013/0044793 A1 | 2/2013 | Haartsen |
| 2013/0175937 A1* | 7/2013 | Nakajo ................. H05B 37/02 315/200 R |
| 2014/0008991 A1* | 1/2014 | Maud ..................... H02J 17/00 307/104 |
| 2014/0015329 A1* | 1/2014 | Widmer ............... G01D 5/2006 307/104 |

FOREIGN PATENT DOCUMENTS

| | | |
|---|---|---|
| JP | 2010063012 A2 | 3/2010 |
| JP | 2011160573 A2 | 8/2011 |
| JP | 2013165383 A2 | 8/2013 |
| WO | WO2010061827 A1 | 6/2010 |
| WO | 2013046104 A1 | 4/2013 |
| WO | 2013103943 A1 | 7/2013 |

* cited by examiner

CONTACTLESS LED LIGHTING FIXTURE AND LED LIGHTING NETWORK INCLUDING CONTACTLESS LED LIGHTING FIXTURE

CROSS-REFERENCE TO PRIOR APPLICATIONS

This application is the U.S. National Phase application under 35 U.S.C. § 371 of International Application No. PCT/IB2015/051755, filed on Mar. 11, 2015, which claims the benefit of U.S. Patent Application No. 61/969,495, filed on Mar. 24, 2014. These applications are hereby incorporated by reference herein.

TECHNICAL FIELD

The present invention is directed generally to lighting systems, networks, and fixtures. More particularly, various inventive systems and apparatus disclosed herein relate to a contactless LED lighting fixture and an LED lighting network which includes one or more contactless LED lighting fixtures and/or other contactless lighting network components.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Digital lighting networks have been developed which include a plurality of lighting fixtures, each of which includes one or more LED light sources, all of which may be connected to a common power line or lines and/or shared data line(s). Some lighting networks may also include other lighting network components, such as lighting sensors.

In most lighting networks, each lighting network component (e.g., lighting fixture) includes a basic power and data interface that relies on a connector system which employs a physical metal-to-metal contact between the network component and the network cable(s) or wire(s). For example, some known lighting fixtures employ an insulation displacement contact (IDC) which allows the lighting fixture to be quickly and easily electrically connected to the cable(s) or wire(s) of a lighting network at virtually any desired location.

However, lighting fixtures which employ electrically conductive physical contacts to receive power and communicate data from the cable(s) or wire(s) of a lighting network, and lighting networks in which such lighting fixtures are deployed, are prone to performance degradation and failure due to wear and damage to the electrically conductive physical contacts. Such wear or damage may occur, for example, when the contacts are exposed to contaminants such as moisture, or operate in suboptimal connection conditions. As a result, these electrical contacts sometimes require careful treatment and/or special design considerations to make them more reliable. Furthermore, in some cases lighting network components are inserted or connected to a lighting network over and over again, for example when they are moved from one light network to another, or when a lighting network is reconfigured, etc. In that case, performance degradation or failure may occur because the electrical contacts themselves also generally have a limitation or specification on the maximum number of times they can be inserted or connected.

Thus, there is a need in the art to provide lighting fixtures and other lighting network components which are more reliable when exposed to contaminants such as moisture or operation in suboptimal connection conditions, and which can be inserted or connected over and over again without degradation due to wear on the physical electrically conductive contacts. In particular, there is a need in the art for lighting network components, and a lighting network which can allow the lighting network components to be functionally connected to the lighting network, without the need for any physical electrically conductive contact or connection, between the lighting network components and the power and signal carriers, or lines, of the lighting network.

SUMMARY

The present disclosure is directed to inventive methods and apparatus for a lighting network and a network component for a lighting network. For example, the present invention can provide a contactless lighting fixture, and a lighting network which can employ one or more such contactless lighting fixtures and/or other contactless lighting network components.

Generally, in one aspect, a lighting network comprises: a lighting network base station and at least one contactless lighting network component. The lighting network base station includes: a radio frequency amplifier configured to receive AC Mains power, to convert the AC Mains power to a radio frequency power signal, and to supply the radio frequency power signal to a lighting network line pair, and a base station power line communication coupler configured to couple the lighting network line pair to a first power line communication device. The at least one contactless lighting network component is located remotely from the lighting network base station along the lighting network line pair, and includes: at least one contactless lighting network component coupler configured to extract electrical power from the radio frequency power signal on the lighting network line pair, and to couple the lighting network line pair to a second power line communication device. The base station power line communication coupler and the contactless lighting network component coupler are configured to communicate network data between the first power line communication device and the second power line communication device via the lighting network line pair.

The contactless lighting network component coupler(s) may be configured to extract (e.g., inductively) electrical power from the radio frequency power signal on the lighting network line pair without making an electrically conductive physical contact to the lighting network line pair, and to couple (e.g., inductively) the lighting network line pair to the second power line communication device without making an electrically conductive physical contact to the lighting network line pair. Such an arrangement eliminates the need for a metal to metal connection between the lighting network lines and the contactless lighting network component(s).

Eliminating the need for a metal to metal connection between the lighting network lines and the contactless lighting network component(s) may provide one or more of the following benefits.

First, the reliability of the lighting network may be increased. Electrical connection between the wires (e.g., line pair) of the lighting network and the contactless lighting network component(s) is achieved without the need to break the insulation of the cable carrying the network wires (e.g., line pair), and does not expose a metal connector on the lighting network component. This may eliminate any need for seals around the connector system.

Second, a lighting network which can employ contactless lighting network components promotes creation of a modular light system. Traditionally relocation of lighting network components would require cable modifications, connector replacements, or in some cases, fabrication of a custom cable. However, a lighting network which can employ contactless lighting network component allows such relocation to be accomplished without the need to make any physical metal-to-metal electrical connection between the lighting network lines and a relocated lighting network component. As a result the end user may be able to configure his installation in the field without the need to modify cables or connections. An end user may be able to simply relocate a lighting network component onto any part of the network cable (e.g., line pair) and clamp the lighting network component in place. This modularity also allows a variety of different lighting network components to be co-located onto the same lighting network lines since there is no need to support a common connector or wire interface between lighting network components. These lighting network components simply need to have the same power and data transfer circuit, and they can coexist on a single pair of network lines.

Third, lighting network component lead time and inventory requirements may be relaxed due to the use of field-configurable lighting network components and the ease of selecting and changing the locations of the lighting network components on the lighting network, using standard building blocks.

Fourth, a lighting network which can employ contactless lighting network components may reduce the difficulty of maintenance for the network. For example, with contactless lighting network components it is possible to add and remove contactless lighting network components to the system while the network is "live." Because there is no metal contact to be made, there is no chance of a user inadvertently touching a live part of the installation just as there is no opportunity for a connection to create a spark during the process. Also, as all contactless lighting network components in a lighting network could be fully sealed from the factory, there would be no need to break any seal in the field for installation, maintenance or other reason.

Fifth, a lighting network which can employ contactless lighting network components may provide increased safety. Since there is no metal to metal connection there is no risk of a connection having problems such as high resistance, arching, etc. This means that such a system could be installed in extreme environments, such as environments which experience explosive gas conditions, underwater, etc.

Sixth, a lighting network which can employ contactless lighting network components may provide reliable high speed data transfer. Inductive data transfer can support a reliable high data rate. Contactless lighting network components eliminate the possibility of corrosion of a connector which exists in a network which employs connectorized lighting network components, and which can lead to a loss of data integrity and/or increased resistance. Such increased resistance can occur as a result of fretting and corrosion of connectors, and can lead to heating of the connections and reduce the efficiency of the overall network. Eliminating connectors also eliminates the possibility for a miswired connection and electrical connectors which do make full contact or have intermittent contact.

Seventh, a lighting network which can employ contactless lighting network components may provide easy intercommunication between lights, sensors, power supplies, etc due to a common shared data/power bus, in contrast to lighting networks which employ power lines and a data cable with various types of input connectors.

In some embodiments, the at least one contactless lighting network component coupler comprises: a power coupler configured to extract the electrical power from the radio frequency power signal on the lighting network line pair; and a lighting network component power line communication coupler, separate from the power coupler, configured to couple the lighting network line pair to the second power line communication device.

In some embodiments, the at least one contactless lighting network component includes at least a second contactless lighting network component. The second contactless lighting network component comprises: a second contactless lighting network component coupler configured to extract electrical power from the radio frequency power signal on the lighting network line pair; and to couple the lighting network line pair to a third power line communication device. The base station power line communication coupler and the second contactless lighting network component coupler are configured to communicate network data between the first power line communication device and the third power line communication device via the lighting network line pair.

In some embodiments, the lighting network further comprises a plurality of lighting network components, wherein each of the lighting network components has a corresponding address in the network, and wherein the lighting network base station and the lighting network components are configured to communicate the network data via the lighting network line pair according to an Ethernet protocol.

In some embodiments, the lighting network comprises a plurality of contactless lighting network components including at least one contactless lighting network component which includes at least one light emitting diode (LED) light source, and at least one contactless lighting network component which includes at least one sensor, wherein the at least one contactless lighting network component which includes at least one sensor is configured to communicate sensor data to the lighting network base station via the lighting network line pair, wherein the lighting network base station is configured to communicate lighting data to the at least one contactless lighting network component which includes at least one LED light source via the lighting network line pair, wherein, the lighting data represents at least one operating parameter for the at least one LED light source, and wherein the lighting data is generated in response to the sensor data.

In some embodiments, the lighting network further comprises an impedance termination remotely located from the lighting network base station, wherein the lighting network base station is disposed at a first end of the lighting network line pair, and wherein the impedance termination is connected across the lighting network line pair at a second end of the lighting network line pair which is opposite the first end of the lighting network line pair.

In some embodiments, the at least one contactless lighting network component further includes: at least one light emitting diode (LED) light source; and a lighting driver configured to be powered by the electrical power extracted from the radio frequency power signal and to drive the at least one LED light source with the extracted electrical power.

In some versions of these embodiments, the at least one contactless lighting network component further includes the second power line communication device, wherein the second power line communication device is connected to the at least one contactless lighting network component coupler and is configured to receive at least some of the network data from the lighting network base station via a power line communication signal carried on the lighting network line pair.

In some versions of these embodiments, the received network data includes lighting data representing at least one operating parameter for the at least one LED light source, wherein the at least one contactless lighting network component further includes a controller powered by the electrical power extracted from the radio frequency power signal, wherein the controller is connected to an output of the second power line communication device, and wherein an output signal of the controller is provided to the lighting driver to control an operation of the lighting driver in response to the lighting data.

In some embodiments, the at least one contactless lighting network component further includes: the second power line communication device, wherein the second power line communication device is connected to the at least one contactless lighting network component coupler; and a data input/output port configured to communicate at least part of the network data with a device external to the at least one contactless lighting network component.

In some versions of these embodiments, the at least one contactless lighting network component further includes a power converter configured to receive the electrical power extracted from the radio frequency power signal and further configured to output AC power from a power output port of the at least one lighting network component.

In some versions of these embodiments, the at least one contactless lighting network component further includes a sensor configured to sense at least one of motion, ambient light, smoke, temperature, a gas, an image, audio, a location, and a pressure, and in response thereto to produce sensor data; and the second power line communication device, wherein the second power line communication device is connected to the at least one contactless lighting network component coupler and is configured to communicate the sensor data via a power line communication signal carried on the lighting network line pair.

In another aspect, a contactless lighting network component comprises: a power line communication device; and at least one contactless lighting network component coupler configured to extract electrical power from a radio frequency power signal carried on a lighting network line pair, and further configured to couple the lighting network line pair to a power line communication device. The power line communication device is connected to the at least one power line communication coupler and is configured to communicate network data via a power line communication signal carried on the lighting network line pair.

The contactless lighting network component coupler(s) may be configured to extract (e.g., inductively) electrical power from the radio frequency power signal carried on the lighting network line pair without making an electrically conductive physical contact to the lighting network line pair, and to couple (e.g., inductively) the lighting network line pair to the power line communication device without making an electrically conductive physical contact to the lighting network line pair In some embodiments, the at least one contactless lighting network component coupler comprises: a power coupler configured to extract the electrical power from the radio frequency power signal on the lighting network line pair; and a lighting network component power line communication coupler, separate from the power coupler, configured to couple the lighting network line pair to the power line communication device.

In some embodiments, the contactless lighting network component further comprises: at least one light emitting diode (LED) light source; and a lighting driver configured to be powered by the electrical power extracted from the radio frequency power signal and to drive the at least one LED light source with the extracted electrical power.

In some versions of these embodiments, the network data includes lighting data representing at least one operating parameter for the at least one LED light source, and the contactless lighting network component further includes a controller powered by the electrical power extracted from the radio frequency power signal, wherein the controller is connected to the output of the power line communication device, and wherein an output of the controller is provided to the lighting driver to control an operation of the lighting driver in response to the lighting data.

In some embodiments, the contactless lighting network component further includes a power converter configured to receive the electrical power extracted from the radio frequency power signal and further configured to output AC power from a power output port of the lighting network component.

In some versions of these embodiments, the contactless lighting network component further includes a data input/output port configured to communicate at least part of the network data with a device external to the lighting network component.

In some versions of these embodiments, the contactless lighting network component further includes a sensor configured to sense at least one of motion, ambient light, smoke, temperature, a gas, an image, audio, a location, and a pressure, and in response thereto to produce sensor data, wherein the power line communication device is connected to the at least one contactless lighting network component coupler and is configured to communicate the sensor data via a power line communication signal carried on the lighting network line pair.

In yet another aspect, a method of operating a lighting network comprises: employing at least one contactless coupler to extract electrical power from a radio frequency power signal carried on a lighting network line pair, and to couple the lighting network line pair to a power line communication device; and communicating network data between the power line communication device and another power line communication device via a power line communication signal carried on the lighting network line pair.

The contactless coupler may extract (e.g., inductively) the electrical power from the radio frequency power signal on the lighting network line pair without making an electrically conductive physical contact to the lighting network line pair, and may (e.g., inductively) couple the lighting network line pair to the power line communication device without making an electrically conductive physical contact to the lighting network line pair.

In some embodiments, employing at least one contactless coupler comprises: employing a contactless power coupler to extract the electrical power from the radio frequency power signal on the lighting network line pair; and employing a contactless lighting network component power line communication coupler, separate from the power coupler, to couple the lighting network line pair to the power line communication device.

In some embodiments, the method further comprises: producing a DC voltage from the electrical power extracted by the at least one contactless coupler; providing the DC voltage to a lighting driver to power the lighting driver; and driving at least one LED light source with the extracted electrical power.

In some versions of these embodiments, the network data includes lighting data representing at least one operating parameter for the at least one LED light source, and the method further includes: providing the DC voltage to a controller connected to an output of the second power line communication receiver; and employing the controller to control an operation of the lighting driver in response to the lighting data.

In some embodiments, the method further includes sensing at least one of motion, ambient light, smoke, temperature, a gas, an image, audio, a location, and a pressure, and in response thereto producing sensor data; and communicating, via the at least one contactless coupler, the sensor data by the power line communication signal carried on the lighting network line pair.

In some embodiments, the method further includes: generating lighting data in response to the sensor data; and communicating the lighting data via the power line communication signal carried on the lighting network line pair.

In still another aspect, an apparatus, comprises: a radio frequency amplifier configured to receive AC Mains power, to convert the AC Mains power to a radio frequency power signal, and to supply the radio frequency power signal onto a lighting network line pair, and a base station power line communication coupler configured to couple the lighting network line pair to a first power line communication device.

In some embodiments, the base station power line communication coupler is configured to communicate network data between the apparatus and at least one lighting network component via the lighting network line pair.

In some versions of these embodiments, the base station power line communication coupler is configured to transmit at least some of the network data from the at least one lighting network component via a power line communication signal carried on the lighting network line pair, wherein the transmitted network data includes lighting data representing at least one operating parameter for the at least one LED light source of the at least one lighting network component.

In some versions of these embodiments, the base station power line communication coupler is configured to receive at least some of the network data from the at least one lighting network component via the power line communication signal carried on the lighting network line pair, wherein the received network data includes sensor data sensor generated in response to at least one of sensed motion, sensed ambient light, sensed smoke, a sensed temperature, a sensed gas, a sensed image, sensed audio, a sensed location, and a sensed pressure, and the lighting data is generated in response to the sensor data.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any functional interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The term "contactless" as used herein refers to the absence of an electrically conductive physical contact (e.g., a metallic contact) for passing an electrical signal and/or power between the signal carriers (e.g., a line pair) of a lighting network and a component which is operationally or functionally connected to that lighting network. As used herein, a "contactless connection" refers to an electrical connection which conveys an electrical signal, for example data or electrical power, between a component and a second component (or signal line(s)) without using an electrically conductive (e.g., metal) physical contact. An example of such a contactless connection is an inductive conduction wherein an electrical signal or power is conveyed to or from a component inductively via a coupler such as a transformer or electrical coil.

The term "lighting network component" as used herein refers to a functional component which is operable as part of a lighting network. Examples, without limitation, of a lighting network component include a lighting fixture, a sensor, and a lighting network interface adaptor.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

As discussed above, lighting fixtures which employ physical electrically conductive contacts to receive power and data, and lighting networks in which such lighting fixtures are deployed, are prone to performance degradation and failure due to wear and damage to the physical electrically conductive contacts when the contacts are exposed to contaminants such as moisture, or operate in suboptimal connection conditions, or when the lighting fixtures are inserted or connected to the lighting network over and over again.

More generally, Applicants have recognized and appreciated that it would be beneficial to provide lighting network components (e.g., lighting fixtures), and a lighting network which can allow the lighting network components to be functionally connected to the lighting network without the need for any physical electrically conductive contact between the lighting network components and the power and signal carriers, or lines, of the lighting network.

In view of the foregoing, various embodiments and implementations of the present invention are directed to contactless lighting network components such as a contactless lighting fixture, and a lighting network which employs one or more such contactless lighting network components. Here, it is understood that when the lighting network and lighting network components are referred to as "contactless" this refers to the absence of an electrically conductive physical contact (e.g., a metallic contact) for passing an electrical signal and/or power between the lighting network signal carrier(s) (e.g., a lighting network line pair) and lighting network components which are operationally or functionally connected to that lighting network. This does not preclude the possibility that a lighting network component may include some other electrically conductive physical contact to some other external device.

Figure 1:
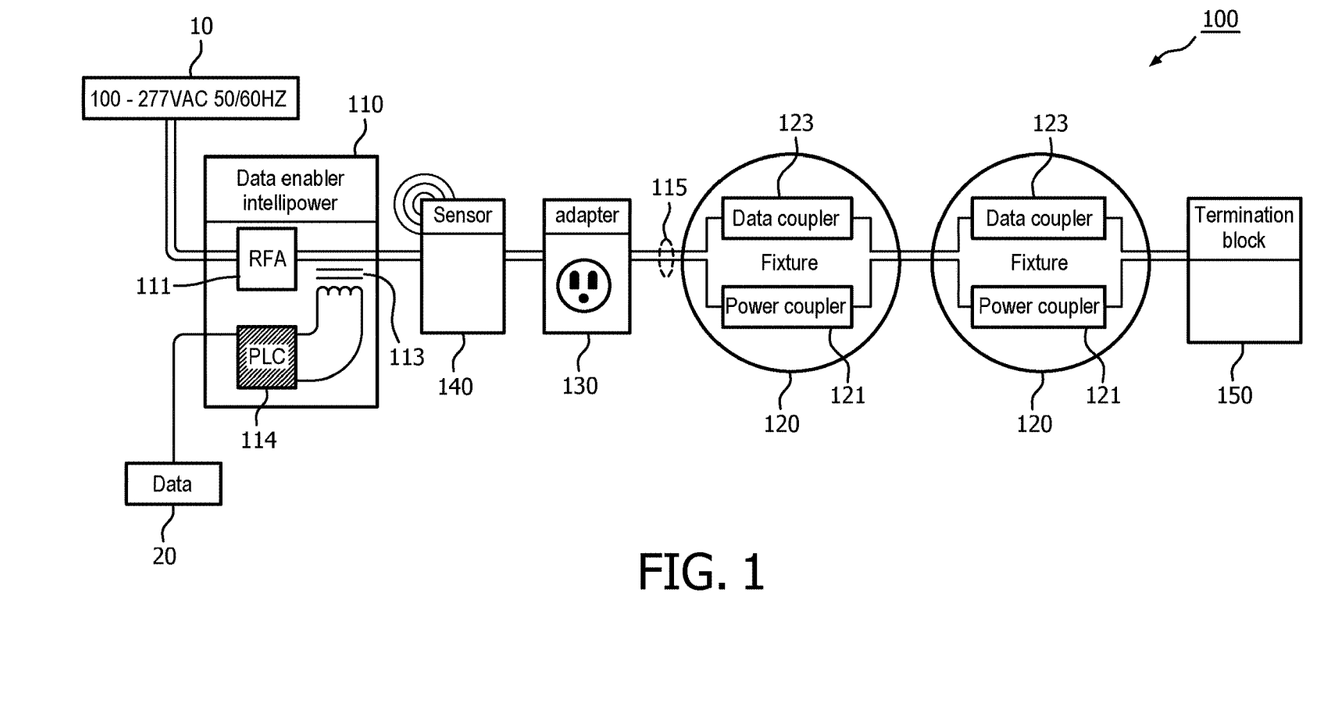
FIG. 1 illustrates an example embodiment of a lighting network.

FIG. 1 illustrates an example embodiment of a lighting network 100. Lighting network 100 includes a lighting network base station 110 connected to a plurality of contactless lighting network components via a lighting network line pair 115 which operates as power and signal carriers for lighting network 100. In lighting network 100 of FIG. 1, the contactless lighting network components include lighting fixtures 120, a lighting network interface adaptor 130, and a lighting sensor module 140. Lighting network 100 may be a light emitting diode (LED) lighting network.

Although FIG. 1 illustrates an embodiment of lighting network 100 which includes two lighting fixtures 120, one lighting network interface adaptor 130, and one lighting sensor module 140, it should be understood that in general the lighting network may include any number and combination of contactless lighting network components, limited only by constraints such as the maximum length of the lighting network line pair, the thickness or gauge of the conductors in the lighting network line pair, the power level which can be supplied via the lighting network line pair, the required operating efficiency of the lighting fixtures, the data or communication capabilities of the lighting network line pair, etc. Effects of these constraints on the lighting network will be illustrated in greater detail below with respect to an example configuration.

As illustrated in FIG. 1, lighting network base station 110 includes a radio frequency (RF) amplifier 111, a power line communication (PLC) coupler 113, and a power line communication (PLC) device 114. In various embodiments, lighting network base station 110 may include other elements, including for example a controller or processor.

RF amplifier (RFA) 111 is configured to receive AC Mains power from AC Mains 10, to convert the AC Mains power to a radio frequency (RF) power signal, and to supply the radio frequency power signal to lighting network line pair 115.

In some embodiments, AC Mains power may comprise a 50 Hz to 60 Hz at a voltage in a voltage range of 100-277 volts.

RFA 111 may operate to produce an RF power signal in one or more of a variety of frequency ranges in the RF bands, including very low frequencies (VLF—or 3 kHz to 30 kHz), low frequencies (LF—30 kHz to 300 kHz), medium frequencies (MF—300 kHz to 3 MHz); high frequencies (HF—3 MHz to 30 MHz) or higher frequency ranges in the RF bands. However, in particular it is understood that RF amplifier 111 and the RF power signal do not operate in optical frequency bands such as infrared, visible, or ultraviolet bands. In some embodiments, RFA 111 may output an RF power signal having a frequency of about 20 kHz and a voltage level of 260 VAC at the output of lighting network base station 110. In some embodiments, RFA 111 may have an output power level of 1 kilowatt. However, it is understood that other voltage levels, power levels, and frequencies may be employed in lighting network 100, and these numbers are only provided to illustrate a concrete embodiment.

PLC device 114 is configured to communicate with an external data communication device 20 to exchange data therewith (i.e., to receive data therefrom and/or to transmit data thereto). In general, data received from external data communication device 20 may be received in a variety of formats, including for example, Ethernet, DMX, DALI, wireless and analog formats (e.g., an analog dimming signal), etc. In that case, beneficially PLC device 114 may be configured to convert the received data into network data which is communicated by lighting network base station 110 to one or more lighting network components (e.g., one or more lighting fixtures 120 and/or one or more lighting network interface adaptors 130) via lighting network line pair 115. In some embodiments, external data communication device 20 may comprise a computer, a user interface, a wireless receiver, a connection to another lighting network, etc. In some embodiments, lighting network base station 110 may include a controller or processor which may operate in conjunction with PLC device 114 to convert data between a data format (e.g., an Ethernet packet) for a power line communication (PLC) signal for communicating the data via lighting network line pair 115, and other various data formats, for example Ethernet, DMX, DALI, wireless and analog formats (e.g., an analog dimming signal), etc. In some embodiments external data communication device 20 and/or a processor of lighting network base station 110 may execute one or more software algorithms to operate as a lighting controller for lighting network 100, controlling operations of the one or more lighting fixtures 120 of lighting network 100. Examples of such operations will be described below.

PLC coupler 113 is configured to couple PLC device 114 to lighting network line pair 115. PLC coupler 113 may be an inductive coupler which couples PLC device 114 to lighting network line pair 115 without making an electrically conductive physical contact to lighting network line pair 115. In various embodiments, PLC coupler 113 may comprise an inductor, transformer, or electrical coil. In some embodiments, PLC coupler 113 is configured to couple a PLC signal from PLC device 114 onto line pair 115 whereby the PLC signal carries network data, for example lighting data for controlling one or more operating parameters of one or more light sources (e.g., LED-based light sources) of one of more lighting fixtures 120.

The PLC signal may operate in one or more of a variety of frequency ranges in the RF bands, but does not operate in optical frequency bands such as infrared, visible, or ultraviolet bands. In that case, it is seen that PLC coupler 113 is not an optocoupler. In some embodiments, the PLC signal may operate on lighting network line pair 115 at one or more frequencies in a frequency range of 2-68 MHz In some embodiments, the PLC signal may comprise an Ethernet signal. In some embodiments, the PLC signal may communicate data over the lighting network line pair 115 at a data rate of about 200 Mbps.

Lighting network line pair 115 comprises a pair of electrically conductive wires and may operate as a transmission line with characteristic impedance at the operating frequency(s) of the RF power signal and PLC signal in the RF frequency bands. In various embodiments, lighting network line pair 115 may comprise a twisted pair, a coaxial cable, etc. In some embodiments, the output impedance of RFA 111 may be selected to operate with the characteristic impedance of lighting network line pair 115. In that case, termination block 150 may be selected to have an impedance which is matched to the output impedance of RFA 111. In some embodiments, termination block 150 may be omitted, which may result in degraded performance of lighting network 100, for example reduced efficiency. In some embodiments, lighting network 100 may employ other lines, wires, or signal carriers in addition to lighting network line pair 115.

Further details of example embodiments of lighting fixture 120, lighting network interface adaptor 130, and lighting sensor module 140 are illustrated in FIGS. 2A-B, 3A-B and 4A-B, respectively.

Figure 2A:
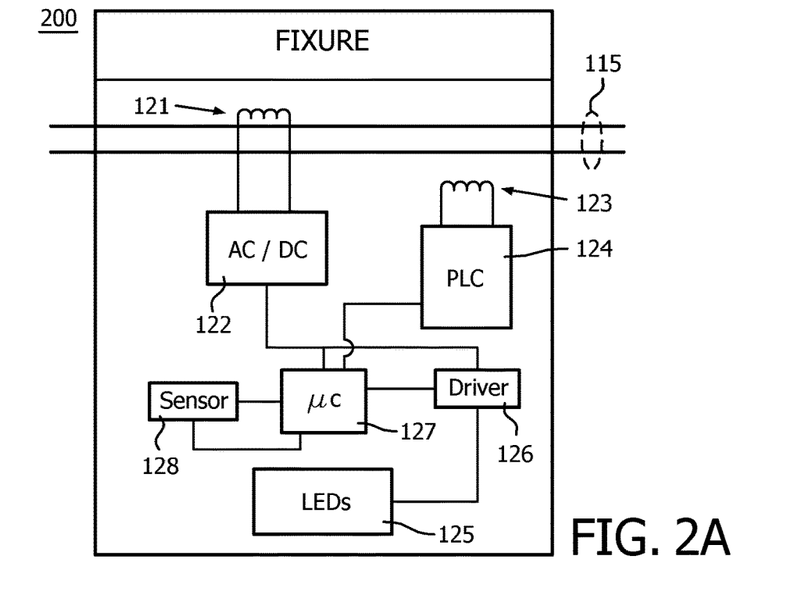
FIGS. 2A and 2B illustrate two example embodiments of a contactless lighting fixture for a lighting network.

FIG. 2A illustrates an example embodiment of a lighting fixture 200 for a lighting network. Lighting fixture 200 may be one embodiment of lighting fixture 120 of FIG. 1. Lighting fixture 200 may be referred to as a contactless lighting fixture as it is configured to be operationally or functionally connected to lighting network 100 without having any electrically conductive physical contact (e.g., a metallic contact) to lighting network line pair 115 for passing an electrical signal (e.g., a data signal) and/or power between lighting network line pair 115 and lighting fixture 200. Lighting fixture 200 includes a power coupler 121, a power converter 122, a power line communication (PLC) coupler 123, a power line communication (PLC) device 124, a lighting emitting diode (LED) based lighting unit 125, a lighting driver 126, a controller 127, and one or more sensors 128.

Power coupler 121 may be an inductive coupler, and is configured to extract electrical power from the RF power signal on lighting network line pair 115 without making an electrically conductive physical contact to lighting network line pair 115. In various embodiments, power coupler 121 may comprise an inductor, transformer, or electrical coil. As noted above, the RF power signal operates in one or more of a variety of frequency ranges in the RF bands, but is not an optical signal operating in an optical band. In that case, it is seen that power coupler 121 is not an optocoupler.

Power converter 122 is configured to convert the power extracted by power coupler 121 from the RF power signal on lighting network line pair 115 into a desired form for use by lighting fixture 200, for example to supply power to one or more of PLC device 124, LED-based lighting unit 125, lighting driver 126, controller 127, and/or sensor 128. In some embodiments, power converter 122 includes an AC/DC converter which converts a high frequency AC signal (e.g., at 20 kHz) into a stable DC voltage as a power supply voltage for one or more of PLC device 124, LED-based lighting unit 125, lighting driver 126, controller 127, and/or sensor 128. In some embodiments, power converter 122 may include a rectifier, a buck converter, a linear voltage regulator, and/or other common elements of power converters.

PLC coupler 123 is configured to couple PLC device 124 to lighting network line pair 115. PLC coupler 123 may be an inductive coupler which couples PLC device 124 to lighting network line pair 115 without making an electrically conductive physical contact to lighting network line pair 115. In various embodiments, PLC coupler 123 may comprise an inductor, transformer, or electrical coil. In some embodiments, PLC coupler 123 is configured to couple to PLC device 124 a power line communication (PLC) signal which is carried on lighting network line pair 115. The PLC signal may carry network data, for example lighting data for controlling one or more operating parameters of LED-based lighting unit 125. In some embodiments, PLC coupler 123 is configured to couple onto lighting network line pair 115 a power line communication (PLC) signal produced by PLC device 124. The PLC signal may carry network data, for example sensing data generated by sensor 128 as discussed below. As noted above, the PLC signal may operate in one or more of a variety of frequency ranges in the RF bands, does not operate in optical frequency bands such as infrared, visible, or ultraviolet bands. In that case, it is seen that PLC coupler 123 is not an optocoupler.

PLC device 124 is connected to PLC coupler 123. PLC device 124 is also connected to controller 127. In various embodiments, PLC device 124 may comprise a data receiver, a data transmitter, or a data transceiver. In some embodiments, PLC device 124 may receive network data from lighting network line pair 115 via PLC 123, for example lighting data for controlling one or more operating parameters of LED-based lighting unit 125, and supply the network data to controller 127. In some embodiments, PLC device 124 may receive network data, for example sensing data generated by sensor 128, from controller 127, and may produce a PLC signal communicates the network data, and which may be coupled onto lighting network line pair 115 by PLC coupler 123.

LED-based lighting unit 125 may include one or more LED light sources. In some embodiments, LED-based lighting unit 125 may be a multi-channel lighting unit. When LED-based lighting unit 125 includes more than one LED light source, in various embodiments the LED light sources may have the same or different colors than each other. For example, in various embodiments the LED light sources may include one or more red LED light sources, one or more blue LED light sources, one or more green LED light sources, and/or one or more white LED light sources. In some embodiments, the relative light output levels of various LED light sources may be controlled such that LED-based lighting unit 125 outputs light having desired characteristics, such as intensity, color, and/or color temperature. In some embodiments, the relative light output levels of various LED light sources may be controlled by controller 127 in response to lighting data received by lighting fixture 200 as network data from lighting network line pair 115 via PLC coupler 123 and PLC device 124. In some embodiments, lighting fixture 200 may include more than one LED-based lighting unit 125.

Lighting driver 126 is connected to power converter 122, LED-based lighting unit 125, and controller 127. Lighting driver 126 is configured to supply power from power converter 122 to LED-based lighting unit 125 under control of controller 127. In some embodiments, lighting driver 126 may include one or more pulse-width modulators (PWM) which can be used to control a current supplied to one or more LEDs of LED-based lighting unit 125 in response to one or more PWM signals from controller 127. A variety of configurations may be employed fro lighting driver 126 depending upon what is desired for a particular lighting fixture 200.

In some embodiments, controller 127 may include a processor (e.g., a microprocessor) and memory which stores programming instructions for the processor to cause the processor to execute one or more routines or algorithms to control lighting driver 126 and/or to interface with sensors(s) 128 and PLC device 124.

Controller 127 is connected to PLC device 124, lighting driver 126, and sensor(s) 128. As noted above, controller 127 may receive an output signal from PLC device 124, where the output signal communicates network data which was extracted from lighting network line pair 115 by PLC coupler 123. The network data may include lighting data which represents one or more operating parameters for LED-based lighting unit 125 and/or one or more of the LED light sources of LED-based lighting unit 125. Examples of such parameters may include a dimming level, a duty cycle, a lighting pattern, a color, etc. In response to the received lighting data, controller 127 may generate and supply to lighting driver 126 one or more output signals to control an operation of lighting driver 126, which in turn controls one or more operating parameters of LED-based lighting unit 125. In some embodiments, controller 127 may output one or more PWM control signals to control a level of current supplied by lighting driver 126 to one or more of the LED light sources of LED-based lighting unit 125, thereby controlling an intensity of light output by the LED light source(s).

In some embodiments, controller 127 may receive sensor data from sensor(s) 128, and may supply this sensor data to PLC device 124 to be included in a PLC signal coupled onto lighting network line pair 115 by PLC coupler 123, as network data, as discussed above. In some embodiments, the sensor data may be communicated from lighting fixture 200 to lighting network base station 110 and/or one or more other contactless lighting network components of lighting network 100.

Sensor(s) 128 may sense one or more environmental conditions and in response thereto, produce sensor data. Sensor(s) 128 may sense one or more of: motion, ambient light, smoke, temperature, a gas, an image (still or motion), audio, a location, and a pressure associated with lighting fixture 200 and in response thereto, produce sensor data which can be communicated as network data onto lighting network line pair 115 by PLC device 124 and PLC coupler 123 as a PLC signal. In some embodiment, lighting fixture 200 may not include any sensors 128.

In some embodiments of lighting fixture 200, separate inductive couplers may be employed for receiving a PLC signal from lighting network line pair 115, and injecting a PLC signal onto lighting network line pair 115.

Figure 2B:
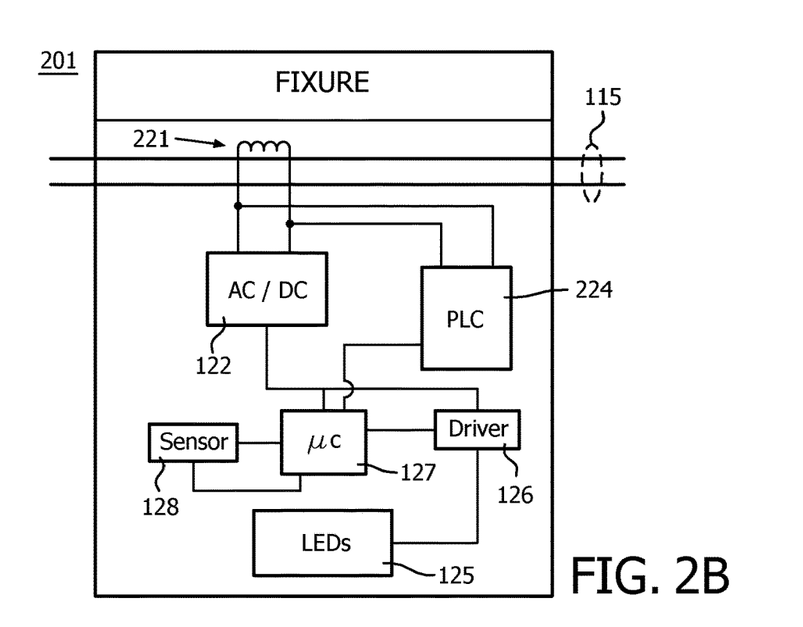

FIG. 2B illustrates another example embodiment of a lighting fixture 201 for a lighting network. Lighting fixture 201 may be one embodiment of lighting fixture 120 of FIG. 1. Lighting fixture 121 may be referred to as a contactless lighting fixture as it is configured to be operationally or functionally connected to lighting network 100 without having any electrically conductive physical contact (e.g., a metallic contact) to lighting network line pair 115 for passing an electrical signal (e.g., a data signal) and/or power between lighting network line pair 115 and lighting fixture 201.

Lighting fixture 201 is identical to lighting fixture 200 described above, with the following differences. In particular, instead of the separate power coupler 121 and a PLC coupler 123 of lighting fixture 200, lighting fixture 201 employs a single lighting network component coupler 221 to extract electrical power from the radio frequency power signal on lighting network line pair 115 without making an electrically conductive physical contact to lighting network line pair 115, and to couple lighting network line pair 115 to a second power line communication device 224 so as to communicate the PLC signal with lighting fixture 201 without making an electrically conductive physical contact to lighting network line pair 115. In this case, in some embodiments second power line communication device 224 may include a transformer (e.g., an RF transformer) and/or a filter for separating a PLC signal carrying network data over lighting network line pair 115 from the radio frequency power signal carried on lighting network line pair 115.

In some embodiments, lighting network component coupler 221 may be an inductive coupler.

Figure 3A:
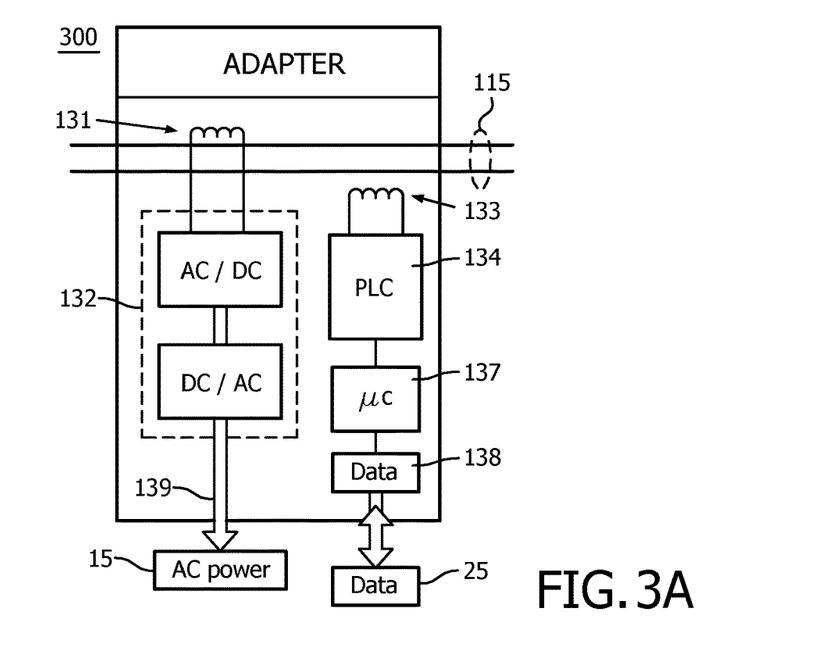
FIGS. 3A and 3B illustrate two example embodiments of a lighting network interface adaptor for a lighting network.

FIG. 3A illustrates an example embodiment of a lighting network interface adaptor 300 for a lighting network. Lighting network interface adaptor 300 may be one embodiment of lighting network interface adaptor 130 of FIG. 1. Lighting network interface adaptor 300 may be referred to as a contactless lighting network interface adaptor as it is configured to be operationally or functionally connected to lighting network 100 without having any electrically conductive physical contact (e.g., a metallic contact) to lighting network line pair 115 for passing an electrical signal (e.g., a data signal) and/or power between lighting network line pair 115 and network interface adaptor 300. Lighting network interface adaptor 300 includes a power coupler 131, a power converter 132, a power line communication (PLC) coupler 133, a power line communication (PLC) device 134, a controller 137, a data input/output (I/O) interface 138, and a power output port 139.

Elements 131, 133, 134 are similar to elements 121, 123, 124, respectively, which have been described in detail above. So descriptions thereof will not be repeated.

Controller 137 may include a processor (e.g., a microprocessor) and memory which stores programming instructions for the processor to cause the processor to execute one or more routines or algorithms to interface with PLC device 134 and data I/O interface 138.

Controller 137 is connected to PLC device 134 and data I/O interface 138. Controller 137 may receive an output signal from PLC device 134, where the output signal communicates network data which was extracted from lighting network line pair 115 by PLC coupler 133. The network data may include lighting data for one or more lighting fixtures of lighting network 100 and/or sensor data from one or more lighting fixtures and/or sensors of lighting network 100.

In some embodiments, controller 137 may receive network data from data I/O interface 138, and may supply this network data to PLC device 134 to be included in a PLC signal coupled onto lighting network line pair 115 by PLC coupler 133. In some embodiments, this network data may be communicated from lighting network interface adaptor 300 to lighting network base station 110 and/or one or more other contactless lighting network components of lighting network 100.

Power converter 132 is configured to convert the power extracted by power coupler 131 from the RF power signal on lighting network line pair 115 into a desired form for use by lighting network interface adaptor 300, for example to supply power to one or more of PLC device 134, controller 137, and/or data I/O interface 138. In some embodiments, power converter 132 includes an AC/DC converter which outputs a stable DC voltage as a power supply voltage for one or more of PLC device 134, controller 137, and/or data I/O interface 138. In some embodiments, power converter 122 may include a rectifier, a buck converter, a linear voltage regulator, and/or other common elements of AC/DC converters.

In some embodiments, power converter 132 is further configured to convert the power extracted by power coupler 131 from the RF power signal on lighting network line pair 115 into a desired form to be output by power output port 139 of lighting network interface adaptor 300. In some embodiments, power converter 132 may output AC power 15, for example an AC Mains voltage at 50 Hz to 60 Hz at a voltage in a voltage range of 100-277 volts, from power output port 139. In that case, power converter 132 may include a DC/AC converter, for example a power inverter.

Some embodiments may omit power output port 139 for supplying AC power 15, in which case power converter 132 may omit the DC/AC converter.

Data I/O interface 138 receives data from an external data communication device 25 and/or supplies network data received via lighting network line pair 115 to external data communications device 25. In some embodiments, external data communications device 25 may comprise a lighting network base station which extends lighting network 100, or for a second lighting network which is "daisy-chained" to lighting network 100. In various embodiments, data may be exchanged with external data communication device 25 in a variety of formats, including for example, Ethernet, DMX, DALI, wireless and analog formats. In that case, beneficially PLC device 134 may be configured to convert the received data into network data which is communicated by lighting network base station 110 to one or more contactless lighting network components (e.g., one or more lighting fixtures 120 and/or one or more lighting network interface adaptors 130) via lighting network line pair 115. In some embodiments, external data communication device 25 may comprise a computer, a user interface, a wireless receiver, a connection to another lighting network, etc.

Various embodiments of lighting network interface adaptor 300 may provide one or more of the following functions: converting or adapting inductive power to traditional AC power (e.g., AC Mains power); converting or adapting inductive power to DC power output; converting or adapting network data to DMX, Ethernet, Wireless, near field communication (NFC), Bluetooth, and/or other data formats; serving as a data repeater for a second lighting network.

In some embodiments of lighting network interface adaptor 300, separate inductive couplers may be employed for receiving a PLC signal from lighting network line pair 115, and injecting a PLC signal onto lighting network line pair 115. Furthermore, although not specifically illustrated, in some embodiments lighting network interface adaptor 300 may include one or more sensors, such as sensors 128 described above.

Figure 3B:
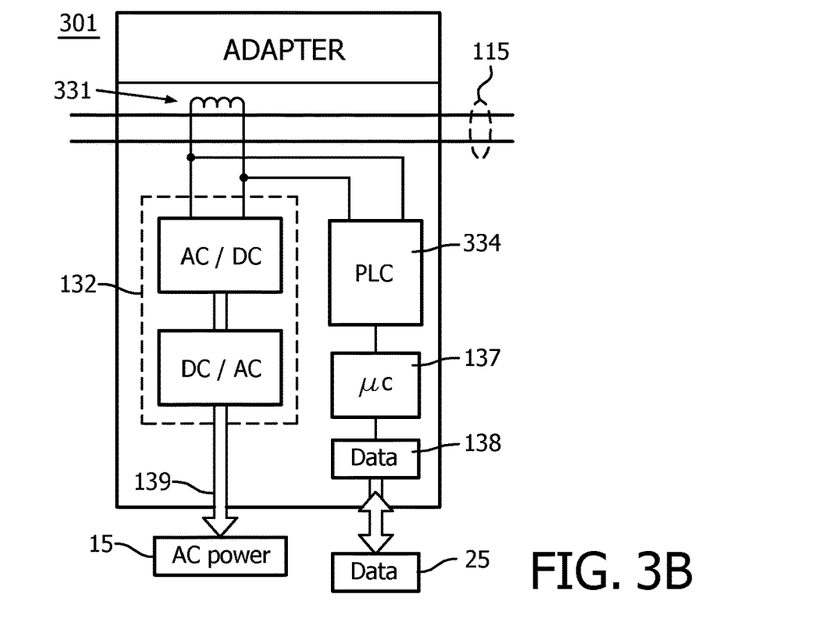

FIG. 3B illustrates another example embodiment of a lighting network interface adaptor 301 for a lighting network. Lighting network interface adaptor 301 may be one embodiment of lighting network interface adaptor 130 of FIG. 1. Lighting network interface adaptor 301 may be referred to as a contactless lighting fixture as it is configured to be operationally or functionally connected to lighting network 100 without having any electrically conductive physical contact (e.g., a metallic contact) to lighting network line pair 115 for passing an electrical signal (e.g., a data signal) and/or power between lighting network line pair 115 and lighting network interface adaptor 301.

Lighting network interface adaptor 301 is identical to lighting network interface adaptor 300 described above, with the following differences. In particular, instead of the separate power coupler 131 and a PLC coupler 133 of lighting network interface adaptor 300, lighting network interface adaptor 301 employs a single lighting network component coupler 331 to extract electrical power from the radio frequency power signal on lighting network line pair 115 without making an electrically conductive physical contact to lighting network line pair 115, and to couple lighting network line pair 115 to a second power line communication device 334 so as to communicate the PLC signal with lighting network interface adaptor 301 without making an electrically conductive physical contact to lighting network line pair 115. In this case, in some embodiments second power line communication device 334 may include a transformer (e.g., an RF transformer) and/or a filter for separating a PLC signal carrying network data over lighting network line pair 115 from the radio frequency power signal carried on lighting network line pair 115.

In some embodiments, lighting network component coupler 331 may be an inductive coupler.

Figure 4A:
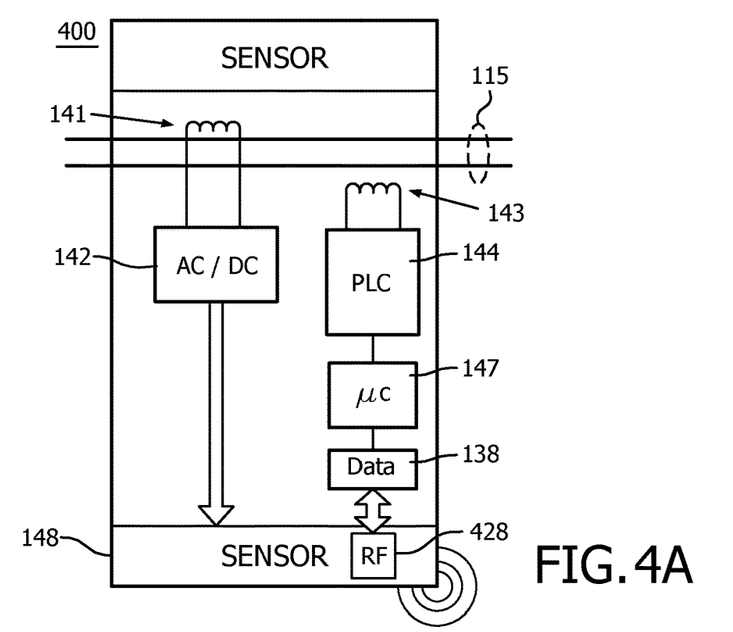
FIGS. 4A and 4B illustrate two example embodiments of a lighting sensor module for a lighting network.

FIG. 4A illustrates an example embodiment of a lighting sensor module 400 for a lighting network. Lighting sensor module 400 may be one embodiment of lighting sensor module 140 of FIG. 1. Lighting sensor module 400 may be referred to as a contactless lighting sensor module as it is configured to be operationally or functionally connected to lighting network 100 without having any electrically conductive physical contact (e.g., a metallic contact) to lighting network line pair 115 for passing an electrical signal (e.g., a data signal) and/or power between lighting network line pair 115 and lighting sensor module 400. Lighting sensor module 400 includes a power coupler 141, a power converter 142, a power line communication (PLC) coupler 143, a power line communication (PLC) device 144, a controller 147, a data input/output (I/O) interface 148, and a sensor 428.

Elements 141, 142, 143, 144 are similar to elements 121, 122, 123, 124, respectively, which have been described in detail above. So descriptions thereof will not be repeated.

Controller 147 may include a processor (e.g., a microprocessor) and memory which stores programming instructions for the processor to cause the processor to execute one or more routines or algorithms to interface with PLC device 144 and data I/O interface 148 and/or sensor 428.

Controller 147 is connected to PLC device 144 and data I/O interface 148. Controller 147 may receive an output signal from PLC device 144, where the output signal communicates network data which was extracted from lighting network line pair 115 by PLC coupler 143. The network data may include lighting command data for changing an operating parameter of sensor 428

Controller 137 may receive sensor data from sensor 428 via data I/O interface 148, and may supply this sensor data to PLC device 144 to be included as network data in a PLC signal coupled onto lighting network line pair 115 by PLC coupler 143. In some embodiments, this network data may be communicated from lighting sensor module 400 to lighting network base station 110 and/or one or more other contactless lighting network components of lighting network 100.

Sensor(s) 428 may sense one or more of: motion, ambient light, smoke, temperature, a gas, an image (still or motion), audio, a location, and a pressure associated with sensor module 400 and in response thereto, produce sensor data which can be communicated as a PLC signal (e.g., packetized data) onto lighting network line pair 115 by PLC device 144 and PLC coupler 143.

In some embodiments, separate inductive couplers may be employed for receiving a PLC signal from lighting network line pair 115, and injecting a PLC signal onto lighting network line pair 115. Furthermore, although not specifically illustrated, in some embodiments lighting network interface adaptor 300 may include one or more sensors, such as sensors 128 described above.

Figure 4B:
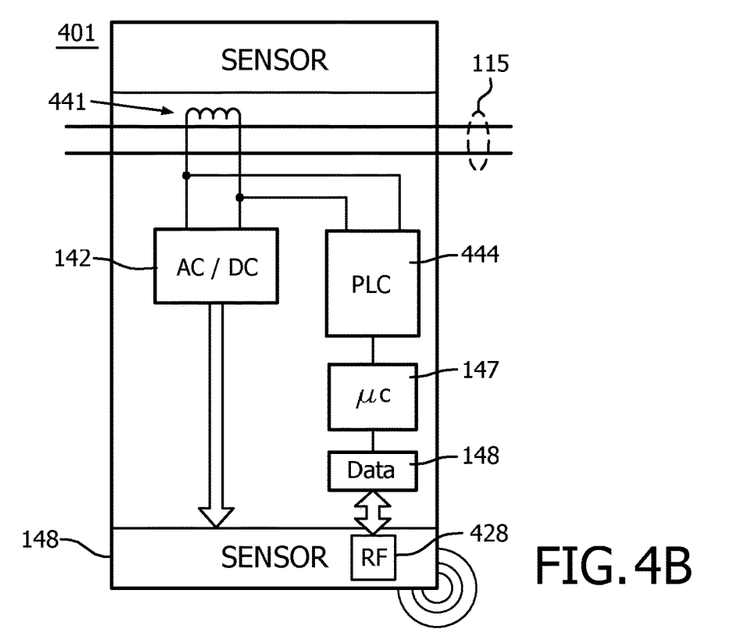

FIG. 4B illustrates another example embodiment of a lighting sensor module 401 for a lighting network. Lighting sensor module 401 may be one embodiment of lighting sensor module 130 of FIG. 1. Lighting sensor module 401 may be referred to as a contactless lighting fixture as it is configured to be operationally or functionally connected to lighting network 100 without having any electrically conductive physical contact (e.g., a metallic contact) to lighting network line pair 115 for passing an electrical signal (e.g., a data signal) and/or power between lighting network line pair 115 and lighting sensor module 401.

Lighting sensor module 401 is identical to lighting sensor module 400 described above, with the following differences. In particular, instead of the separate power coupler 141 and a PLC coupler 143 of lighting network interface adaptor 300, lighting sensor module 401 employs a single lighting network component coupler 441 to extract electrical power from the radio frequency power signal on lighting network line pair 115 without making an electrically conductive physical contact to lighting network line pair 115, and to couple lighting network line pair 115 to a second power line communication device 434 so as to communicate the PLC signal with lighting sensor module 401 without making an electrically conductive physical contact to lighting network line pair 115. In this case, in some embodiments second power line communication device 434 may include a transformer (e.g., an RF transformer) and/or a filter for separating a PLC signal carrying network data over lighting network line pair 115 from the radio frequency power signal carried on lighting network line pair 115.

In some embodiments, lighting network component coupler 441 may be an inductive coupler.

In some embodiments of lighting network 100, lighting fixture 120, lighting network interface adaptor 130, and/or lighting sensor module 140 may comprise an addressable component with a corresponding network address (e.g., a unique address) in lighting network 100. In that case, lighting network 100 may operate with a communication protocol which addresses specific network data to specific lighting network components and/or a lighting network base station 110. Such network data may, for example, be packetized and include headers which indicate an address of a sending and/or intended recipient component. In some embodiments, error correction may be employed to improve the reliability of data communications via lighting network line pair 115. Any of a variety of well known communication techniques may be applied to PLC signals and network data communicated via lighting network line pair 115. In some embodiments, each of the lighting fixtures 120, lighting network interface adaptors 130, and lighting sensor modules 140 may have a corresponding media access control (MAC) address, and packetized network data communicated via lighting network line pair 115 may include headers which include a MAC address of a lighting network component or lighting network base station which transmitted a particular packet and/or which is an intended recipient of a particular packet.

To illustrate the tradeoffs between various parameters of lighting network 100, one concrete embodiment of lighting network 100 will now be described. It should be understood that these parameters are exemplary and not in any way limiting of the invention.

In one embodiment, RFA 111 outputs an RF power signal which carries 1000 watts of power, and each lighting network component is limited to a maximum of 20 watts. In that case, the maximum number of lighting network components or "nodes" which could be accommodated by lighting network 100 would be 50. The line voltage of the RF power signal provided by RFA 111 may be between 100 and 260 volts in this embodiment, and the current supplied by RFA 111 may be about 13.6 amps. If a cable having a standard diameter of 4 mm is employed for lighting network line pair 115, then lighting network line pair 115 may extend to a length of up to 50 meters and the overall power efficiency of this particular embodiment of lighting network 100 may range from 75% to 94%.

These parameters can be traded off in various ways to obtain an optimum solution for any particular application or installation. For example, the total system power can be increased by increasing the diameter of the cable for lighting network line pair 115. The maximum allowable power consumption for each lighting network component can be increased if fewer nodes are permitted and/or by increasing the diameter of the cable for lighting network line pair 115. The overall power efficiency can be improved by increasing the drive voltage provided by RFA 111, and/or by reducing the maximum power allowed for each lighting network component and/or by increasing the diameter of the cable for lighting network line pair 115. Furthermore, the length of an area covered by the lighting network can be extended by daisy-chaining lighting networks together using one or more lighting network interface adaptors 130 and additional lighting network base stations 110.

Beneficially, in some embodiments lighting network components can be placed anywhere along lighting network line pair 115—as close together or as far apart as desired. Furthermore, since the lighting network components are contactless, they can be moved or repositioned over and over without performance degradation or failure cause by worn or damaged electrical contacts.

Example operations of a method of operating a lighting network such as lighting network 100 will now be described. Some of these operations may be performed by a lighting network base station, such as lighting network base station 110, and some operations may be performed by a lighting network component, such as (depending on the operation) lighting fixture 120, lighting network interface adaptor 130, and/or lighting sensor module 140.

The method may include an operation of employing RF amplifier 111 to convert AC Mains power to a radio frequency power signal, and to supply the radio frequency power signal to lighting network line pair 115. The method may also include an operation of coupling lighting network line pair 115 to a first power line communication device 114 without making an electrically conductive physical contact to lighting network line pair 115, so as to communicate network data between first power line communication device 114 and one or more lighting network components 120, 130 and/or 150 of lighting network 100 via lighting network line pair 115.

The method may include an operation of employing at least one coupler of a lighting network component 120, 130 or 140 to extract electrical power from the radio frequency power signal carried on lighting network line pair 115 without making an electrically conductive physical contact to lighting network line pair 115, and to couple lighting network line pair 115 to a second power line communication device without making an electrically conductive physical contact to lighting network line pair 115. The method may include an operation of communicating network data between first power line communication device 114 and a second power line communication device via a power line communication signal carried on lighting network line pair 115.

In some embodiments, the operation of employing at least one coupler comprises: employing power coupler 121, 131 or 141 to extract the electrical power from the radio frequency power signal on lighting network line pair 115 without making an electrically conductive physical contact to lighting network line pair 115; and employing lighting network component power line communication coupler 123, 133 or 143, separate from power coupler 121, 131 or 141, to couple lighting network line pair 115 to the second power line communication device without making an electrically conductive physical contact to lighting network line pair 115.

In some embodiments, the method further includes operations of: producing a DC voltage from the extracted electrical power; providing the DC voltage to lighting driver 126 to power lighting driver 126; and driving at least one LED light source 125 with the extracted electrical power.

In some embodiments, the network data includes lighting data representing at least one operating parameter for LED light source(s) 125, and the method further includes: providing the DC voltage to an output of the second power line communication receiver; and controlling an operation of the lighting driver in response to the lighting data.

In some embodiments, the method also includes operations of: sensing, for example via sensor module 140, at least one of motion, ambient light, smoke, temperature, a gas, an image, audio, a location, and a pressure, and in response thereto producing sensor data; and communicating the sensor data via the power line communication signal carried on lighting network line pair 115. For example, the sensor data may be communicated to lighting network base station 110, where it may be supplied to a lighting controller for lighting network 100, for example external data communication device 20 and/or a processor of lighting network base station 110, for controlling operations of one or more lighting fixtures 120 of lighting network 100.

In some embodiments, the method also includes operations of: generating lighting data in response to the sensor data; and communicating the lighting data via the power line communication signal carried on lighting network line pair 115. In some embodiments, a lighting controller for lighting network 100, for example external data communication device 20 and/or a processor of lighting network base station 110, may employ the sensor data in a lighting control algorithm to determine one or more lighting parameters of the LED light sources 125 of lighting fixtures 120 of lighting network 100. The lighting parameter(s) may be formatted into lighting data which may then be communicated by lighting network base station 110 to one or more of lighting fixtures 120 of lighting network 100 via lighting network line pair 115.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting network, comprising:
   a lighting network base station, including:
      a radio frequency amplifier configured to receive AC Mains power, to convert the AC Mains power to a radio frequency power signal, and to supply the radio frequency power signal to a lighting network line pair, and
      a base station power line communication coupler configured to couple the lighting network line pair to a first power line communication device; and
   at least one contactless lighting network component located remotely from the lighting network base station along the lighting network line pair, wherein the at least one contactless lighting network component includes:
      at least one contactless lighting network component coupler including a power coupler configured to extract electrical power from the radio frequency power signal on the lighting network line pair, and a lighting network component power line communication coupler, separate from the power coupler, configured to contactlessly couple, independently of the power coupler, the lighting network line pair to a second power line communication device,
   wherein the base station power line communication coupler and the at least one contactless lighting network component coupler are configured to communicate network data between the first power line communication device and the second power line communication device via the lighting network line pair.

2. The lighting network of claim 1, wherein the at least one contactless lighting network component includes at least a second contactless lighting network component, wherein the second contactless lighting network component comprises at least a second contactless lighting network component coupler configured to extract electrical power from the radio frequency power signal on the lighting network line pair, and to couple the lighting network line pair to a third power line communication device,
   wherein the base station power line communication coupler and the second contactless lighting network component coupler are configured to communicate network data between the first power line communication device and the third power line communication device via the lighting network line pair.

3. The lighting network of claim 1, further comprising an impedance termination remotely located from the lighting network base station, wherein the lighting network base station is disposed at a first end of the lighting network line pair, and wherein the impedance termination is connected across the lighting network line pair at a second end of the lighting network line pair which is opposite the first end of the lighting network line pair.

4. The lighting network of claim 1, wherein the at least one contactless lighting network component further includes the second power line communication device, wherein the second power line communication device is connected to the at least one contactless lighting network component coupler and is configured to receive at least some of the network data from the lighting network base station via a power line communication signal carried on the lighting network line pair.

5. The lighting network of claim 1, wherein the at least one contactless lighting network component further includes:
   the second power line communication device, wherein the second power line communication device is connected to the at least one contactless lighting network component coupler; and
   a data input/output port configured to communicate at least part of the network data with a device external to the at least one lighting network component.

6. A contactless lighting network component, comprising:
   a power line communication device;
   at least one contactless lighting network component coupler including a power coupler configured to extract electrical power from a radio frequency power signal carried on a lighting network line pair, and a lighting network component power line communication coupler, separate from the power coupler, configured to contactlessly couple, independently of the power coupler, the lighting network line pair to the power line communication device, and
   a power converter configured to receive the electrical power extracted from the radio frequency power signal and further configured to output AC power from a power output port of the contactless lighting network component,
   wherein the power line communication device is connected to the at least one power line communication coupler and is configured to communicate network data via a power line communication signal carried on the lighting network line pair.

7. The contactless lighting network component of claim 6, further comprising:
   at least one light emitting diode (LED) light source; and
   a lighting driver configured to be powered by the electrical power extracted from the radio frequency power signal and to drive the at least one LED light source with the extracted electrical power.

8. The contactless lighting network component of claim 6, wherein the network data includes lighting data representing at least one operating parameter for the at least one LED light source, wherein the contactless lighting network component further includes a controller powered by the electrical power extracted from the radio frequency power signal, wherein the controller is connected to the output of the power line communication device, and wherein an output of the controller is provided to the lighting driver to control an operation of the lighting driver in response to the lighting data.

9. The contactless lighting network component of claim 6, further comprising a data input/output port configured to communicate at least part of the network data with a device external to the contactless lighting network component.

10. The contactless lighting network component of claim 6, further comprising a sensor configured to sense at least one of motion, ambient light, smoke, temperature, a gas, an image, a location, and a pressure, and in response thereto to produce sensor data, wherein the power line communication device is connected to the at least one contactless lighting network component coupler and is configured to communicate the sensor data via a power line communication signal carried on the lighting network line pair.

11. A method of operating a lighting network, comprising:
employing a power coupler to extract electrical power from a radio frequency power signal carried on a lighting network line pair, and a lighting network component power line communication coupler, separate from the power coupler, to contactlessly couple, independently of the power coupler, the lighting network line pair to a power line communication device;
communicating network data between the power line communication device and another power line communication device via a power line communication signal carried on the lighting network line pair;
sensing at least one of motion, ambient light, smoke, temperature, a gas, an image, audio, a location, and a pressure, and in response thereto producing sensor data; and
communicating, via the power line communication coupler, the sensor data by the power line communication signal carried on the lighting network line pair.

12. The method of claim 11, further comprising:
producing a DC voltage from the electrical power extracted by the power coupler;
providing the DC voltage to a lighting driver to power the lighting driver; and
driving at least one LED light source with the extracted electrical power.

13. The method of claim 12, wherein the network data includes lighting data representing at least one operating parameter for the at least one LED light source, wherein the method further includes:
providing the DC voltage to a controller connected to an output of the second power line communication receiver; and
employing the controller to control an operation of the lighting driver in response to the lighting data.

* * * * *